No. 703,469. Patented July 1, 1902.
W. REINHOLD.
PACKING FOR STUFFING BOXES.
(Application filed Nov. 1, 1900.)

(No Model.)

Witnesses:

Inventor:

UNITED STATES PATENT OFFICE.

WILHELM REINHOLD, OF BERLIN, GERMANY.

PACKING FOR STUFFING-BOXES.

SPECIFICATION forming part of Letters Patent No. 703,469, dated July 1, 1902.

Application filed November 1, 1900. Serial No. 35,161. (No model.)

*To all whom it may concern:*

Be it known that I, WILHELM REINHOLD, a subject of the German Emperor, residing at Schönhauser Allee 164, Berlin, Germany, have invented certain new and useful Improvements in Packings for Stuffing-Boxes, of which the following is a specification.

My invention relates to improvements in the packing of stuffing-boxes, and has for its object to avoid several disadvantages and imperfections occurring principally in the metal stuffing-boxes at present in use.

In the known stuffing-boxes the packing consists of a series of rings, each of these latter consisting of two or three segmental parts. Packings composed in this manner contain a great number of single semicircular or segmentally-shaped parts, which must be inserted one after the other into the stuffing-box, and, apart from the inconvenience of such manipulation, it is also very difficult to insert all the individual parts or members of such packing so exactly as to form a really tight packing, which, however, does not produce undue friction of the rod. These difficulties are entirely dispensed with and the whole packing can be exactly and readily inserted into the stuffing-box by constructing the packing in such a manner that a plurality of segmentally-shaped members form two rows, constituting one externally-conical ring of, so to say, double the height of one row and in which all the members of the one row are so arranged with reference to the other row as to tightly cover the radial spaces remaining between the end faces of the members. Furthermore, a number of pins parallel with the rod and adapted to be tightened are provided, which pass through holes of all the members of the one row and engage into corresponding holes provided in the other row, so as to yieldingly and in the manner of a chain connect each member of one row to the adjacent member of the second row. These jointed conical metal rings, which can be widened or by removing one of the above-mentioned pins opened, so as to be very easily laid around the rod, form, together with solid rings of any suitable material, a zone of packing, and several such zones can be placed one above the other, according to the height of the stuffing-box.

In the annexed drawings an example of the new packing for stuffing-boxes is represented.

Figure 1:
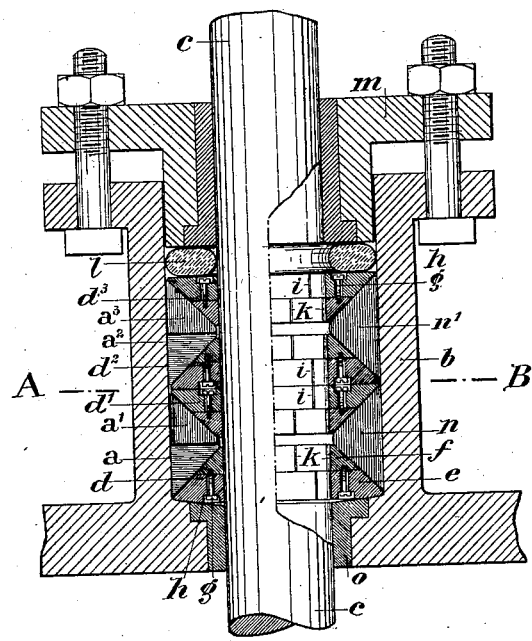
Figure 2:
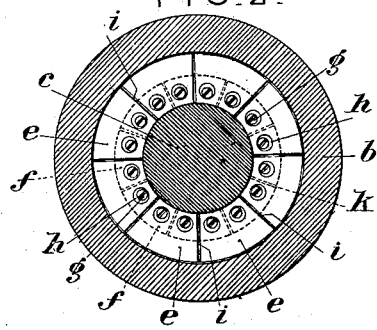

Figure 1 represents a vertical section of a stuffing-box with packing and a partial interior view of the latter. Fig. 2 is a plan view or section on the line A B of Fig. 1.

The ring $a$ with conical bore is preferably made in two parts and fixed together to form a whole by means of screws after it is placed around the piston-rod and inserted into the stuffing-box $b$. Into this ring $a$ a conical jointed ring $d$ is inserted. The jointed ring $d$ consists of separate segmental truncated conical parts $e$, which fill the wider part of the ring $a$. Arranged alternately to these and to break joint with them are segmental conical parts or links $f$, (see Fig. 2,) which are connected with the parts $e$ by means of screws $g$. These screws $g$ are preferably only threaded at their ends and pass through holes $h$, which leave sufficient play to enable the ring to be stretched in such a manner that such link-rings can be placed around the piston-rod. Further the play which the screws $g$ have in the corresponding holes $h$ enables the tightening of the packing when same has become worn. The surfaces between the links $e$ and $f$ are carefully made and, if necessary, polished, so that they afford complete tightness. The surfaces between the rings $a\,a'$ and $a^2\,a^3$ and between these and the jointed rings $d\,d'\,d^2\,d^3$ are of course also carefully made. As shown on the left side of Fig. 1, upon the solid ring $a$, a similarly-shaped but reversed ring $a'$ is placed, and into this ring $a'$ a similar but reversed jointed ring $d'$ is inserted, and so on. Upon the last metal ring a fiber ring $l$ is placed in the known manner, and the pressure exercised upon the packing in drawing the gland $m$ tight is thus rendered uniform. Of course the solid rings $a\,a'$ and $a^2\,a^3$ can be combined to form a ring $n$ or $n'$, as shown on the right side of Fig. 1, that only jointed rings $d$ can be used in connection with jointed rings $d$, or these alternately with fiber packing.

In some cases it will be advisable to employ only one jointed ring to replace the worn-out foot of the stuffing-box in order to prevent the destruction of the fiber packing which may be above it by direct contact with steam.

It may be mentioned that by the alternate sections of the various segments the steam is strongly held back. Further, by means of the joining of the ring $d$ the complete surrounding of the piston-rod is rendered possible.

If, as is frequently the case, the surface of the bush $o$ nearest the stuffing-box is concave, it is advisable that the nearest ring should be similarly shaped.

Of course instead of metal graphite or the like can be used in the manufacture of the packing described if the use of such materials appears preferable under the existing circumstances.

I declare that what I claim is—

1. In a packing for stuffing-boxes, the combination of two external conically-shaped rings, completing each other to a truncated cone of respectively-increased height, each ring consisting of a plurality of radially-movable segmental members, with longitudinally-directed pins, engaging with both ends into holes in each two of the members, partly covering each other, such pins being adapted to connect both multidivided rings together in the manner of a chain, and means for pressing the rings against the rod to be tightened, substantially as set forth.

2. In a packing for stuffing-boxes, the combination of two external conically-shaped rings, completing each other to a truncated cone of increased height, each ring consisting of a plurality of radially-movable segmental members, with longitudinally-directed pins, one end of which engages by a thread the threaded hole of one of two segmental members, partly covering each other, the other end of such pin being provided with a head resting within a suitable recess of the other member, and means for pressing both rings against the rod to be tightened, substantially as set forth.

3. In a packing for stuffing-boxes, the combination of two external conically-shaped rings, completing each other to a truncated cone of respectively-increased height, each ring consisting of a plurality of radially-movable segmental members, with longitudinally-directed pins, one end of which engages by a thread the threaded hole of one of two segmental members, partly covering each other, the other end of such pin being provided with a head, resting within a suitable recess in the other member, each recess and the corresponding hole leaving a play around the head and the pin sufficient for widening the rings beyond the diameter of the rod to be tightened, substantially as set forth.

4. In a packing for stuffing-boxes the combination of two external conically-shaped rings, with their bottom faces resting against each other, each such ring being built up of two rows of segmental members, those of one row covering the joints between the members of the other row, both such rows being connected together by longitudinally-directed pins, with means for pressing the whole system of segmental members against the rod to be tightened, and longitudinally against each other substantially as set forth.

In witness whereof I have signed this specification in the presence of two witnesses.

WILHELM REINHOLD.

Witnesses:
HENRY HASPER,
FRANK H. MASON.